US009206975B2

(12) United States Patent
Leung et al.

(10) Patent No.: US 9,206,975 B2
(45) Date of Patent: Dec. 8, 2015

(54) NON-GLARE REFLECTIVE LED LIGHTING APPARATUS WITH HEAT SINK MOUNTING

(71) Applicant: Huizhou Light Engine Limited, Huizhou (CN)

(72) Inventors: Wa Hing Leung, Hong Kong (CN); Tin Po Flavio Chu, Hong Kong (CN); Yuk Tsan Sy, Hong Kong (CN)

(73) Assignee: Huizhou Light Engine Limited, Huizhou (CN)

( * ) Notice: Subject to any disclaimer, the term of this patent is extended or adjusted under 35 U.S.C. 154(b) by 170 days.

(21) Appl. No.: 13/948,259

(22) Filed: Jul. 23, 2013

(65) Prior Publication Data

US 2015/0029726 A1 Jan. 29, 2015

(51) Int. Cl.

| | |
|---|---|
| ***B60Q 1/06*** | (2006.01) |
| ***F21V 29/00*** | (2015.01) |
| ***F21V 7/20*** | (2006.01) |
| ***B60Q 1/00*** | (2006.01) |
| ***F21V 29/74*** | (2015.01) |
| ***F21V 29/71*** | (2015.01) |
| *F21K 99/00* | (2010.01) |

(52) U.S. Cl.

CPC ............. *F21V 29/2212* (2013.01); *F21V 29/71* (2015.01); *F21V 29/74* (2015.01); *F21K 9/137* (2013.01)

(58) Field of Classification Search

CPC ...................................................... F21K 9/137
USPC ................................. 362/547, 294, 345, 373
See application file for complete search history.

(56) References Cited

U.S. PATENT DOCUMENTS

| | | | | |
|---|---|---|---|---|
| 2008/0002410 | A1* | 1/2008 | Burton et al. | 362/294 |
| 2008/0007955 | A1* | 1/2008 | Li | 362/294 |
| 2010/0097794 | A1* | 4/2010 | Teng et al. | 362/231 |
| 2010/0264800 | A1* | 10/2010 | Liu et al. | 313/46 |
| 2010/0294465 | A1* | 11/2010 | Chen et al. | 165/104.26 |
| 2010/0314985 | A1* | 12/2010 | Premysler | 313/46 |
| 2012/0194055 | A1* | 8/2012 | Wu | 313/46 |
| 2012/0195042 | A1* | 8/2012 | Chu et al. | 362/249.02 |
| 2013/0249374 | A1* | 9/2013 | Le et al. | 313/12 |

* cited by examiner

*Primary Examiner* — Peggy Neils
*Assistant Examiner* — Alexander Garlen
(74) *Attorney, Agent, or Firm* — Schiff Hardin LLP

(57) ABSTRACT

A lighting apparatus having an axial heat pipe, will a light source, e.g., light-emitting diodes ("LEDs"), mounted on a proximate end of the axial heat pipe so as to face a reflector, the heat pipe passing through the reflector, and the distal end of the heat pipe on the other side of the reflector having a heat sink for dissipating the heat generated by the LEDs, with the heat sink having multiple heat dissipating fins.

12 Claims, 9 Drawing Sheets

NON-GLARE REFLECTIVE LED LIGHTING APPARATUS WITH HEAT SINK MOUNTING

Throughout this application, several U.S. patents, U.S. patent application publication and/or references are referenced. Disclosure of these references in their entirety is hereby incorporated herein by reference.

TECHNICAL FIELD OF THE INVENTION

The present invention relates to heat dissipation in electrical lighting devices and systems. More specifically, alight apparatus uses at least one single-chip or multi-chip light-emitting diode ("LED"), back-reflecting collection optics for LEDs, and an axial heat pipe with a heat sink that promotes efficient heat dissipation generated from the LED while minimizing light obstruction and glare.

BACKGROUND OF THE INVENTION

For years, people have used traditional incandescent or fluorescence lighting to address their interior lighting concerns. However, such lighting presents a number of drawbacks. For example, the popular AR111 halogen light has relatively high power consumption, inefficiency of light dispersion due to the placement of its metal shield in the line sight of the halogen bulb, and its limited effectiveness in preventing glare from the halogen bulb.

A number of LED lighting apparatuses have been designed to replace the AR111 halogen light, as well as other traditional incandescent or fluorescence lighting. Typically, in such LED lighting apparatuses, the LED light source is located at the center of a reflector with its light emission directed outward from the reflection. Additionally, there are LED lights such as PAR38, that use multiple LEDs with their light emissions directed outward from one or more reflectors. These configurations are unable to achieve narrow beam angles, and result in considerable glare since observers are not shielded from the LED light source. Further, these configurations inefficiently distribute heat making the use of high-powered LEDs practically prohibitive.

In an attempt to address these problems, alternative LED lighting apparatuses use a heat pipe and a mirror or reflective surface to reflect light back in the direction of the LED light source. See, e.g., U.S. Pat. No. 6,976,769 to McCullough et al. entitled "Light-Emitting Diode Reflector Assembly Having a Heat Pipe"; U.S. Pat. No. 7,246,921 to Jacobson et al. entitled "Back-Reflecting LED Light Source"; and PCT International Application Publication No. WO 2006/033998 to Magna International Inc. entitled "Thermal Management System for Solid State Automotive Lighting." However, the problem with these apparatuses is in their inability to efficiently dissipate heat, while providing maximum illumination.

Therefore, it is with respect to these considerations and others that the present invention has been made.

SUMMARY OF THE INVENTION

In light of the above, there exists a need to further improve the art.

In an embodiment a lighting apparatus has a concave reflector having a front side with a reflective surface, a rear side and a principal axis, an axial heat pipe disposed along the principal axis of the reflector. The heat pipe has a proximal end extending longitudinally away from the front side of the reflector and a distal end extending longitudinally away from the rear side of the reflector, a light emitting diode ("LED") printed circuit board coupled to the axial heat pipe and oriented at an angle between perpendicular to the principal axis to parallel to the principal axis facing the front side of the reflector, one or more LEDs coupled to the LED printed circuit board and a heat sink thermally coupled to the distal end of the axial heat pipe.

In an exemplary embodiment, the lighting apparatus has a heat sink with a first radially extending heat dissipating planar fin and a second heat dissipating planar fin extending perpendicular to the first planar fin. The center line of the first planar fin is thermally coupled to the axial heat pipe at the principal axis of the reflector, and a center line of the second planar fin may be thermally coupled to the axial heat pipe at the principal axis of the reflector. In this exemplary embodiment, the lighting apparatus the heat sink may have two or more heat dissipating third planar fins disposed parallel to the second planar fin and perpendicular to the first planar fin, with center lines of the third planar fins disposed apart from the principal axis of the reflector. The easing may be coupled to a rim along the periphery of the concave reflector. The casing may also be thermally isolated from the heat sink and has ventilation holes for dissipation of heat energy. The heat sink may have two or more radial heat pipes thermally coupled to the axial heat pipe and extending at least in part radially outward from the axial heat pipe. In addition, the two or more heat dissipating planar fins may be thermally coupled to the two or more radial heat pipes with the planar fins being perpendicular to an axis of the radial heat pipes at a coupling point. The lighting apparatus may have radial heat pipes that are U-shaped, L-shaped, or C-shaped. The heat sink may have four radial heat pipes each perpendicular to the adjacent radial heat pipes, thermally coupled to the axial heat pipe and extending at least in part radially outward from the axial heat pipe. Two or more heat dissipating planar fins may be thermally coupled to the four radial heat pipes with the planar fins being perpendicular to an ask of the radial heat pipes at the coupling point, with the two or more heat dissipating planar fins having angled extensions, forming an approximate 120 angle.

Another embodiment discloses a method of dissipating heat from a lighting apparatus comprising generating light from one or more light emitting diodes; reflecting the light from the one or more light emitting diodes in a concave reflector; transferring heat generated from the one or more light emitting diodes to an axial heat pipe that is disposed along the principal axis of the reflector, passes through the center of axis of the reflector and extends past the non-concave side of the reflector; and transferring the heat from the axial heat pipe to a means for dissipation of heat coupled to the axial beat pipe on the non-concave, side of the reflector.

BRIEF DESCRIPTION OF THE DRAWINGS

The figures are for illustration purposes only and are not necessarily drawn to scale. The invention itself however, may best be understood by reference to the detailed description which follows when taken in conjunction with the accompanying drawings in which.

DETAILED DESCRIPTION OF THE INVENTION

Various embodiments will now be described with reference to the accompanying drawings, which form a part of the description, and which show, by way of illustration, specific embodiments. However, this invention may be embodied in many different forms and should not be construed as limited to the specific embodiments set forth herein. Rather, these embodiments are provided so that this disclosure will be thorough and complete, and will fully convey the scope of the invention to those skilled in the art. As described below, various embodiments of the invention may be readily combined without departing from the scope or spirit of the invention.

The following briefly describes the embodiments of the invention to provide a basic understanding of some aspects of the invention. It is not intended to identify key or critical elements, or to delineate or otherwise narrow the scope of the invention. Its purpose is merely to present some concepts in a simplified form.

One embodiment of the invention is a lighting apparatus that has an axial heat pipe, with a light source mounted on a proximate end of the axial heat pipe so as to face a reflector, the heat pipe passing through the reflector, and the distal end of the heat pipe on the other side of the reflector having a heat sink for dissipating the heat generated by the LEDs. The heat sink may take several different forms such as having a central dissipating fin with multiple cross dissipating fins mounted perpendicular to the central dissipating fin. In another embodiment, C-shaped axial heat pipes may transfer heat to dissipating fins mounted on the C-shaped axial heat pipes. In yet another embodiment, the dissipating fins may have angled sections to maximize the amount of surface area for the dissipation of heat.

Figure 1:
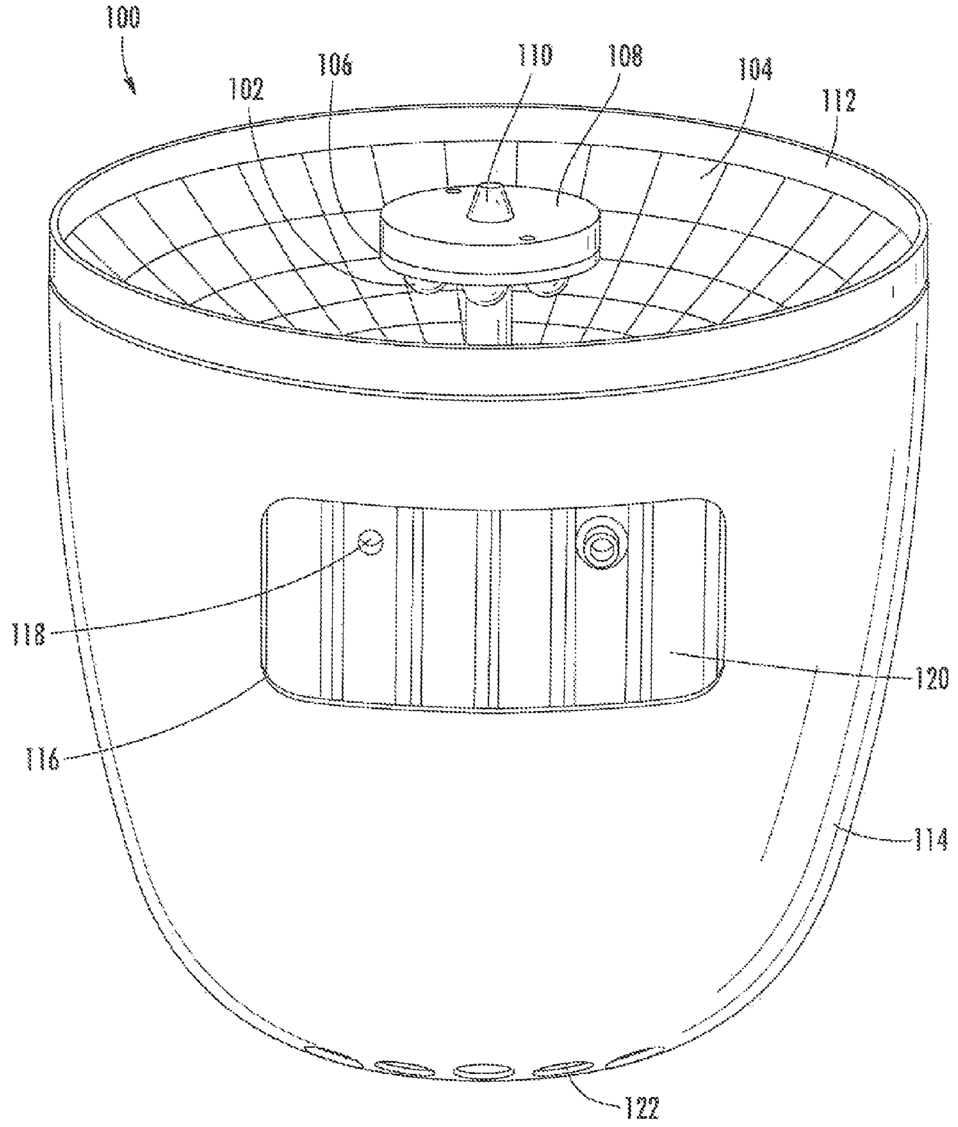
FIG. 1 is a perspective view of a first exemplary embodiment of the present invention.

In more detail, as shown in FIG. 1, lighting apparatus 100 is comprised of LEDs 102 that radiate light towards reflector 104, which then directs the light outward past LEDs 102 toward the area of illumination. LEDs 102 may be high powered and may be an LED module with one or more chips. While one LED may be used in the present invention, typically two or more LEDs would be more suitable for uniformity of the reflected light. LEDs 102 are mounted on LED printed circuit board ("PCB") 106. PCB 106 may be a metal core PCB with glass-reinforced epoxy laminate layer. PCB 106 includes LED circuitry, and acts as a heat-transporting medium. For example, a metal core PCB comprises a base metal plate (copper or aluminum, which is approximately 0.8 to 3 mm thick), a dielectric layer (laminated on top of the base metal plate, which is approximately 0.1 mm thick), and a copper circuit track (printed on top of dielectric layer, which is approximately 0.05 to 0.2 mm thick). In very high power application (Eg: 30 W or above) the dielectric layer can be partially machined away to allow direct contact between LED thermal pad and base metal plate. 106 can also be ceramic based PCB. A ceramic PCB comprises of the base Aluminum Oxide base plate and copper circuit track.

PCB 106 may be thermally coupled to heat spreader 108. Heat spreader 108 may be formed of any material capable of efficiently conveying heat energy such as a metal or ceramic. LEDs 102 may be soldered onto PCB 106 or directly to heat spreader 108, or may be coupled in other ways known in the art, such as use of screws or other mechanical fastening methods along with a thermal paste or thermal grease.

PCB 106 and heat spreader 108 may be coupled to axial heat pipe 110 at a proximal end of the heat pipe. In one embodiment, both PCB 106 and heat spreader 108 are connected to axial heat pipe 110. In alternate embodiments, PCB 106 and/or heat spreader 108 are coupled either directly or indirectly to axial heat pipe 110. The positioning and configuration of LEDs 102 in relation to axial heat pipe 110 may be altered in any number of ways. As one example, a conical platform onto which LEDs 102 are mounted may be angled downward from the proximal end of axial heat pipe 110. In another embodiment, LEDs 102 may be mounted on or near the heat pipe along its circumference so that LEDs 102 radiate light axially outward instead of longitudinally towards reflector 104.

Axial heat pipe 110 may have any number of configurations for the transport of heat energy. For example, axial heat pipe 110 may contain a heat pipe that is cladded with a thermally conductive material such as aluminum, copper, graphite or zinc. The cladding may be used to increase the structural strength of the heat pipe, assist in transferring and spreading the heat from LEDs 102 to the heat pipe and assist in transferring and spreading the heat energy to heat sinks. In another embodiment, the heat pipe may be made of porous copper incorporating a large number cavities filled with pure water. Water within the heat pipe evaporates to vapor as it absorbs thermal energy from a heat source. The vaporized water then migrates along the vapor cavity to cooler sections of the heat pipe. There, the vapor quickly cools and condenses back to fluid, and the fluid is absorbed by the wick, releasing thermal energy. The fluid then returns along the inner cavities to the heated sections, and repeats the heat pipe thermal cycle described above. The heat pipe uses the above-described mechanism to transmit thermal energy from the LED to heat sinks.

Reflector 104 may be coupled to top rim 112. Both reflector 104 and top rim 112 can be made of a thermally-conductive material, such as aluminum, copper or zinc, and may act as a heat sink for dissipating of excess heat energy. Alternatively, reflector 104 and top rim 112 may be made of a non-thermally-conductive material, such as plastic. Reflector 104 has a reflective surface on the concave side suitable for reflecting the light emanating from LEDs 102 outwardly from the concave side. Reflector 104 may take a variety of shapes to achieve various light patterns. It can be shaped as a conic section, (e.g., hyperbola, ellipse or parabola), used singularly or in various combinations, in two-dimension or three-dimensional shapes. Further, reflector 104 may be symmetrical or asymmetrical.

Casing 114 may optionally be coupled to reflector 104 or top rim 112. Casing 114 is made similar to top rim 112 and may be made of either a thermally conductive or non-conductive material. While casing 114 being thermally conductive may increase the heat sink capacity, making it thermally non-conductive and/or thermally isolated from heat sink 120 offers protection to consumers from heat burn and electric shock. Heat sink 120 is contained within casing 114. Casing 114 may be spherical, conical, cylindrical or any other shape capable of accommodating heat sink 120. Casing 114 may have window 116 in one area to permit the mounting of light apparatus 100 into a suitable position through mounting holes 118 in heat sink 120. Casing 114 may have one or more windows 116. Casing 114 may also contain one or more ventilation holes 122 in various locations to allow heat energy to dissipate into the surrounding atmosphere.

Figure 2:
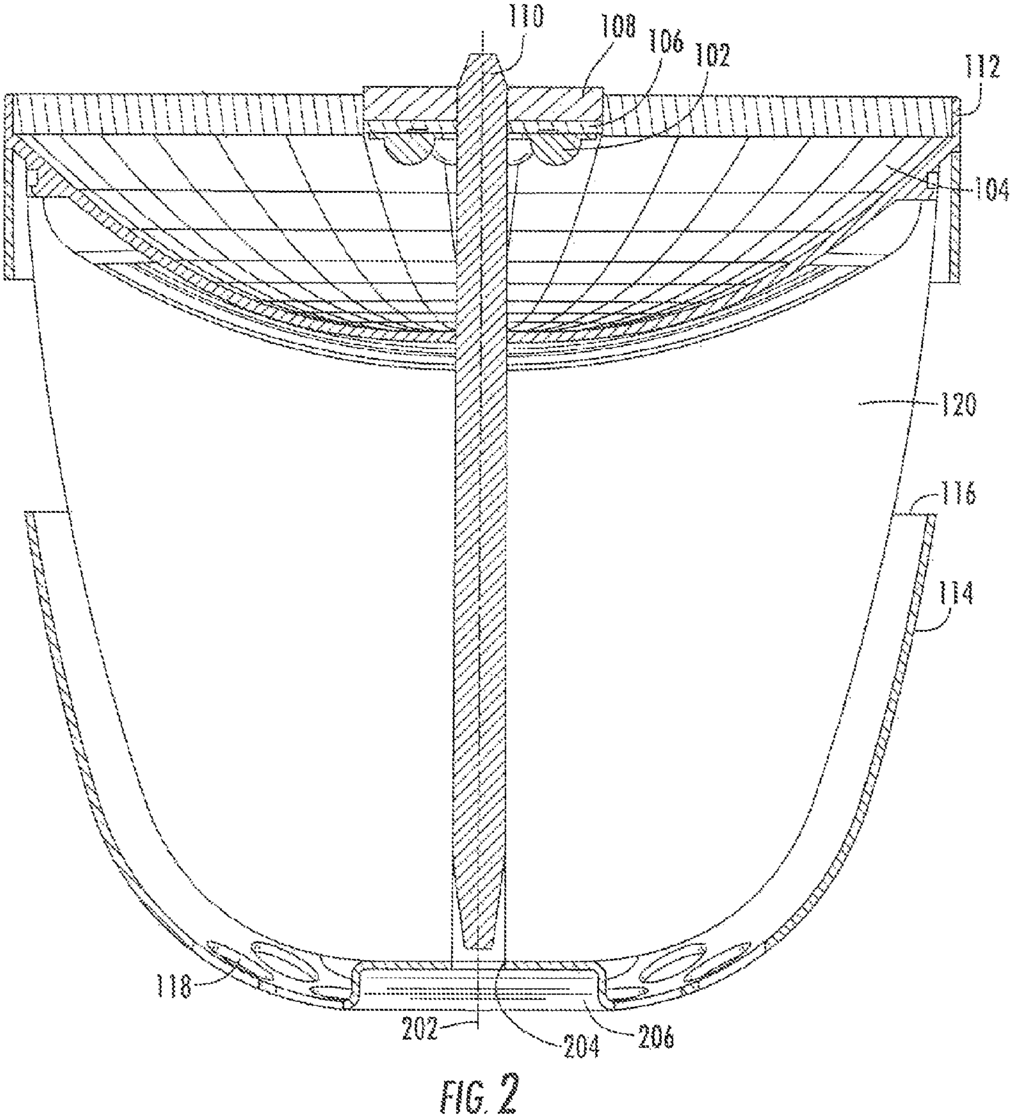
FIG. 2 is a cross section from the side of the embodiment shown in FIG. 1.

As shown in FIG. 2, axial heat pipe 110 extends longitudinally through the center of reflector 104 and into the center of casing 114. The heat pipe may be of any suitable length. Axial heat pipe 110 may be coupled directly to reflector 104 or indirectly through heat sink 120. Axial heat pipe 110 maintains LEDs 102 at the appropriate point above reflector 104, near the focal point of reflector 104, to permit the radiated light to reflect off reflector 104 in the appropriate desired pattern for the use of the lighting apparatus. As shown, the center line of axial heat pipe 110 is coextensive with center axial line 202 of reflector 104, although this configuration may vary by displacing axial heat pipe 110 off of center axial line 202. Heat sink 120 is coupled to a distal end of axial heat pipe 110. Heat sink 120 may be thermally coupled to axial heat pipe 110 from a location starting just after axial heat pipe 110 passes through reflector 104, or may be coupled for only a portion of the length of axial heat pipe 110. Casing 114 may contain opening 204 and cavity 206. Opening 204 and cavity 206 may permit wires to be fed into casing 114 and to LEDs 102 through axial heat pipe 110. Alternatively, the wiring may pass through window 116 in casing 114.

Figure 3:
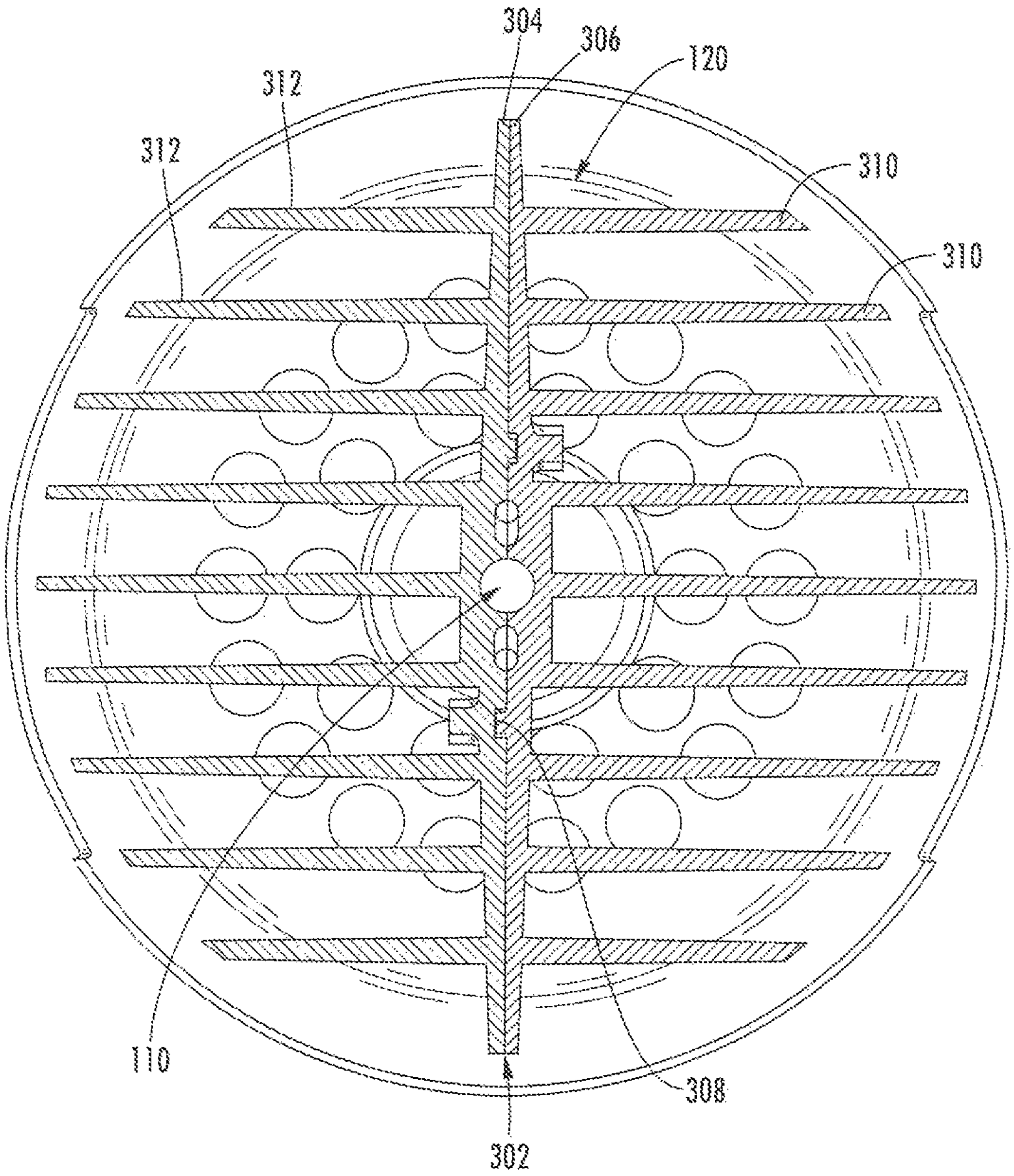
FIG. 3 shows a cross section of a top view of the embodiment shown in FIG. 1.
Figure 4:
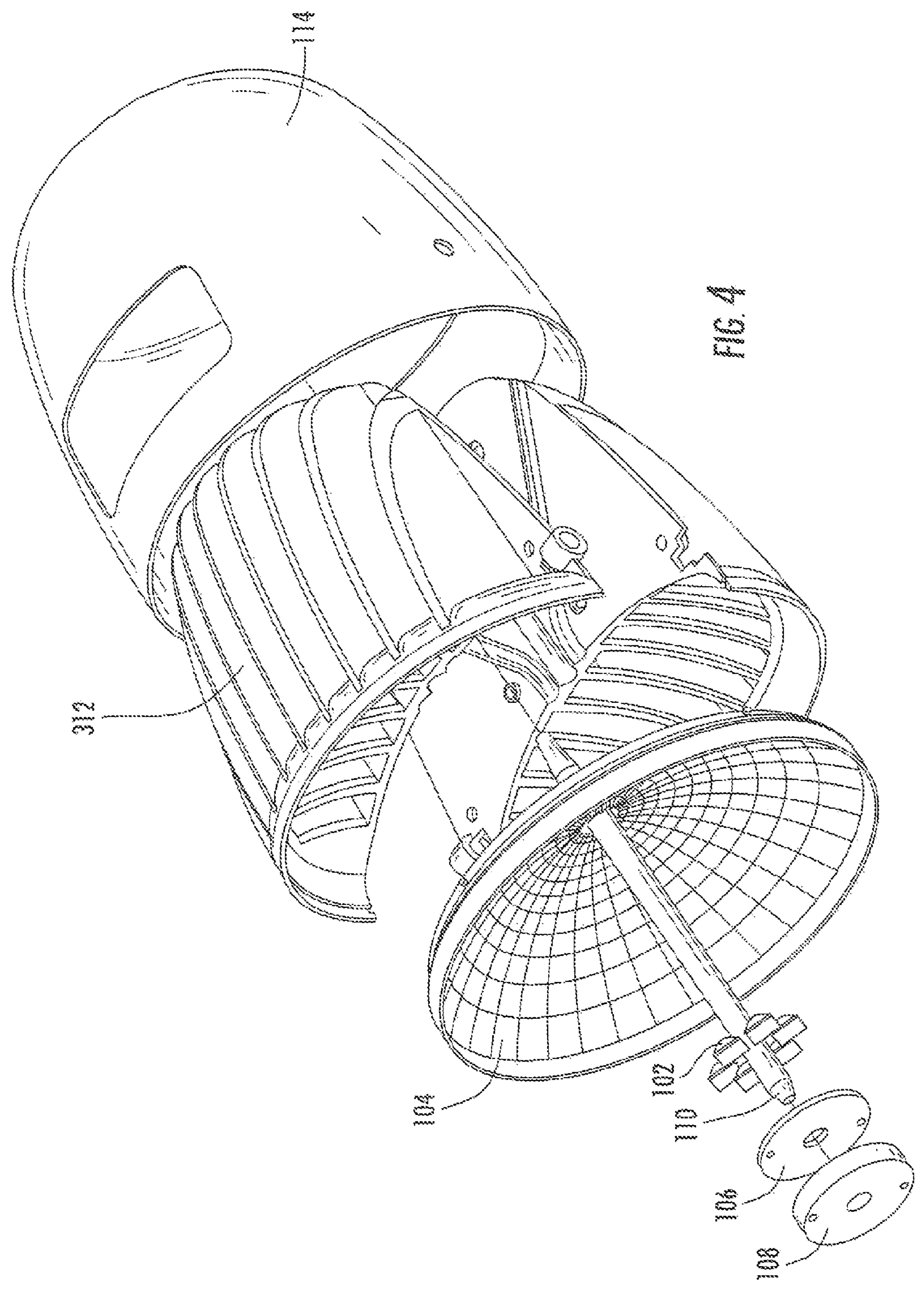
FIG. 4 shows an exploded view of the embodiment shown in FIG. 1.

Heat sink 120 generally has a plurality of heat dissipating fins. FIG. 3 shows a top-cross section of lighting apparatus 100 taken through the portion containing heat sink 120 and FIG. 4 shows an exploded view. In one embodiment, heat sink 120 comprises central dissipating fin 302 and a plurality of cross dissipating ins 310 that are spaced apart along the length of central dissipating fin 302. Central dissipating fin 302 may be a single planar material or may be comprised of fitted sections 304 and 306 shown in FIG. 3. Sections 304 and 306 may be fitted around axial heat pipe 110 along a central axis and may be snap fit, screwed, soldered, adhesively attached or any other means of attachment. Thermal paste may be used to increase the thermal conductivity between sections 304, 306 and axial heat pipe 110. Gross dissipating fins 310 are planar materials where the plane of cross dissipating fins 310 is perpendicular to the plane of central dissipating fin 302. Cross dissipating fins 310 may be integral with either of sections 304 and 306, and there may be two or more or a substantial number of such fins. Central dissipating fin 302 and cross dissipating fins 310 may be made of any high thermal conductivity materials such as aluminum, copper or zinc. The size, shape and number of such dissipating fins depends on the heat dissipating requirements of the lighting apparatus.

When heat is generated by LEDs 102, the heat is generally transferred to axial heat pipe 110 either through PCB 106 or heat spreader 108. The heat is then transferred down axial heat pipe 110 and into heat sink 120. Heat sink 120 spreads the heat energy down central radiating fin 302 and then to cross dissipating fins 310, which dissipates the heat energy into the atmosphere surrounding heat sink 120. Window 116 and ventilation holes 122 permit transfer of heated atmosphere to the outside of casing 114.

Figure 5:
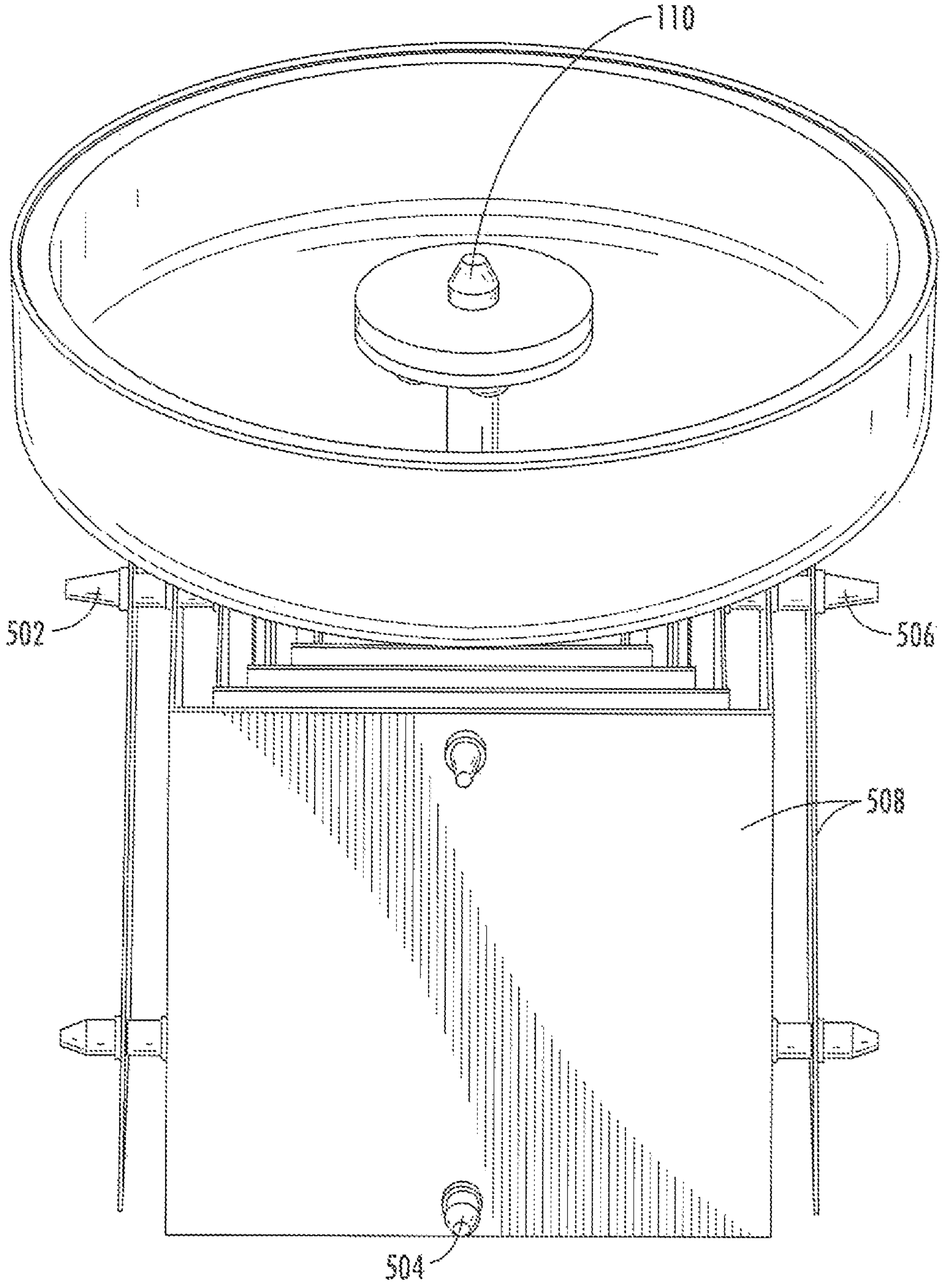
FIG. 5 is a perspective view of a second exemplary embodiment of the present invention.
Figure 6:
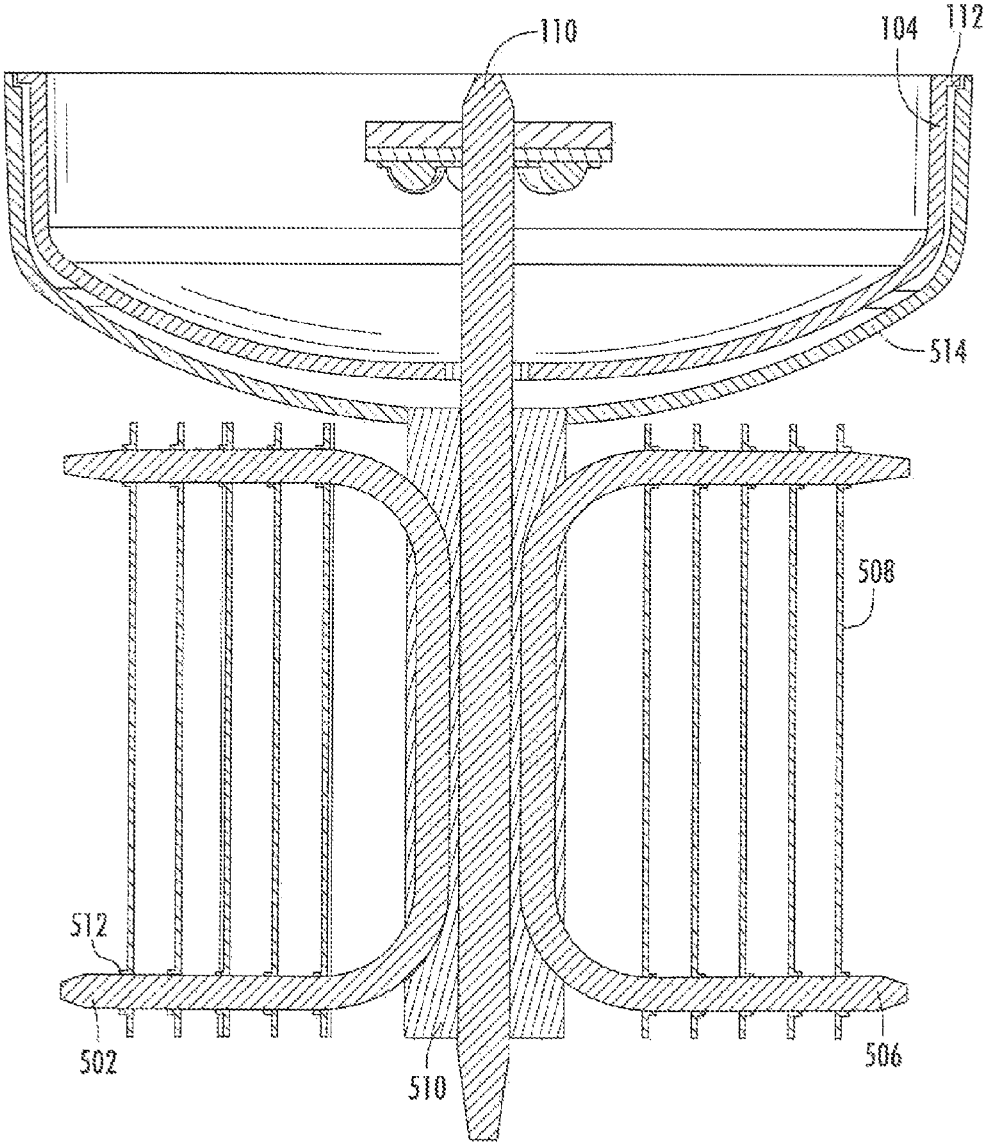
FIG. 6 shows a cross section from the side of the embodiment shown in FIG. 5.
Figure 7:
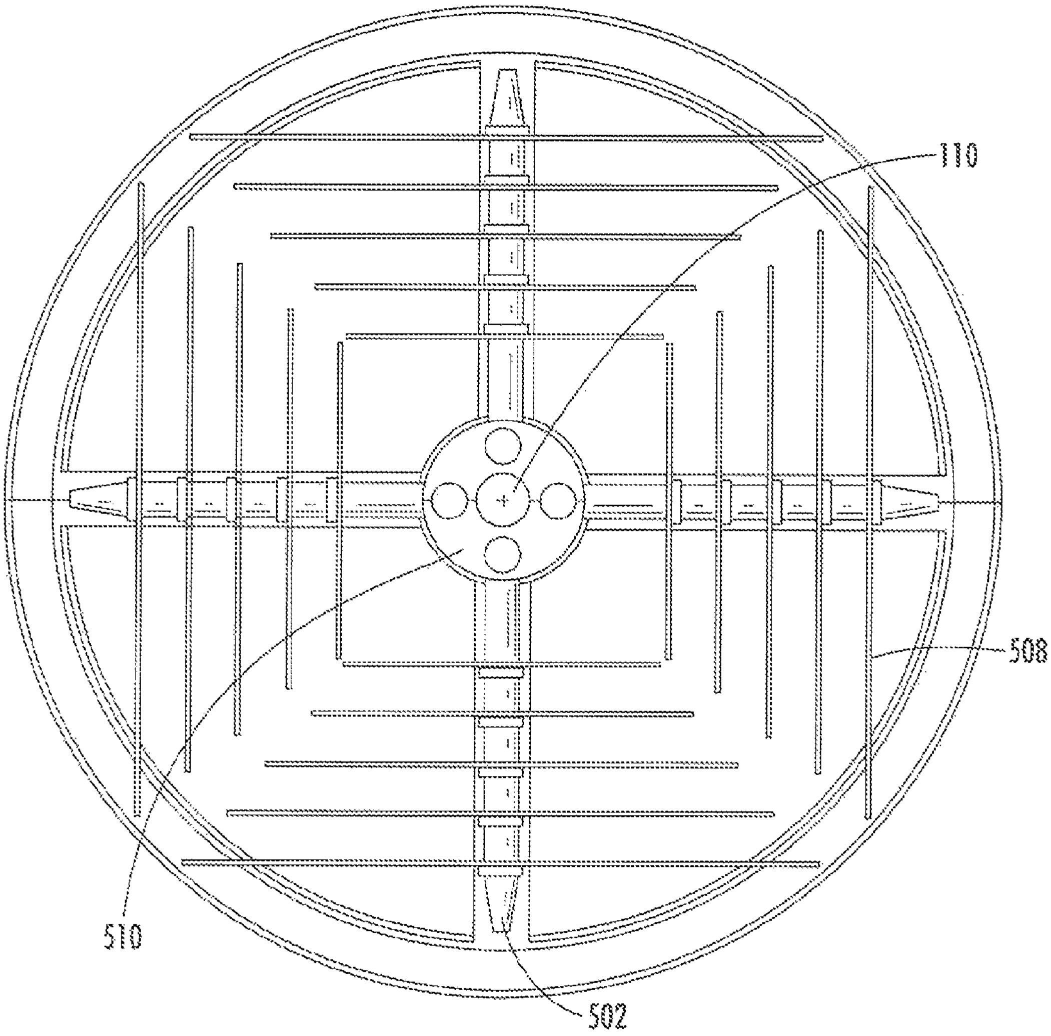
FIG. 7 is a cross section of a top view cross section of the embodiment shown in FIG. 5.

An alternate embodiment of heat sink 120 is shown in FIGS. 5 through 7. In this embodiment, the distal end of axial heat pipe 110 is enclosed within heat distributor 510. Heat distributor 510 is made from a heat conductive material such as casted or forged Aluminum, and may be made from a unitary piece of material or in sections that may be fitted together around axial heat pipe 110. Heat dissipation 508 fins may be made of aluminum or copper. Heat distributor 510 may be coupled to convex extension 514 which is coupled to reflector 104 through top rim 112. Convex extension 514 may be made from a thermally conductive material to aid in heat dissipation. In another embodiment, convex extension 514 may be thermally isolated from heat distributor 510.

Radial heat pipes 502 have the same configuration as and extend radially outward from axial heat pipe 110. In one embodiment, radial heat pipes 502 are generally C-shaped with three straight sections joined by two curved sections. In the embodiments, four beat pipes 502 may be equally spaced around axial heat pipe 110, although, one or more heat pipes may be employed. The middle straight section runs parallel to axial heat pipe 110 so as to facilitate transfer of heat energy and be encased within heat distributor 510. The sections of radial heat pipes 502 may be integral or may be formed from different pieces and/or materials. Other shape configurations may be used such as an L-shape, U-shape or separate straight sections that are thermally coupled, but not directly connected together. Again, axial heat pipe 110, heat distributor 510 and radial heat pipes 502 are thermally coupled to permit efficient transfer of heat energy.

Heat dissipating planar fins 508 are thermally coupled and/or mounted to radial heat pipes 502. Heat dissipating planar fins 508 are typically a thin sheet of material suitable for dissipating heat energy into the surrounding environment. The fins may be integral, made of composites or laminates or any other structures suitable for heat dissipation. Multiple planar fins 508 are mounted on radial heat pipes 502 at spaced apart intervals, with the length and width of each planar fin increasing as the distance from the central axis of axial heat pipe 110 increases. The increase in dimensions as the distance from the central axis increases is a function of efficient utilization of space. The available space where there is no intersection with adjacent perpendicular fins increases with the increase in distance from the central axis. In one embodiment, each radial fin is coupled to each of the outside straight sections of the C-shaped radial heat pipes 502 through a sized opening in planar fins 508. The sized opening creates a contact fit and may contain a portion of the planar fin 512 that is perpendicular to the plane of the planar fin and parallel to the axis of radial heat pipes 502. This facilitates connection and permits better conduction of heat energy from radial heat pipes 502.

Figure 8:
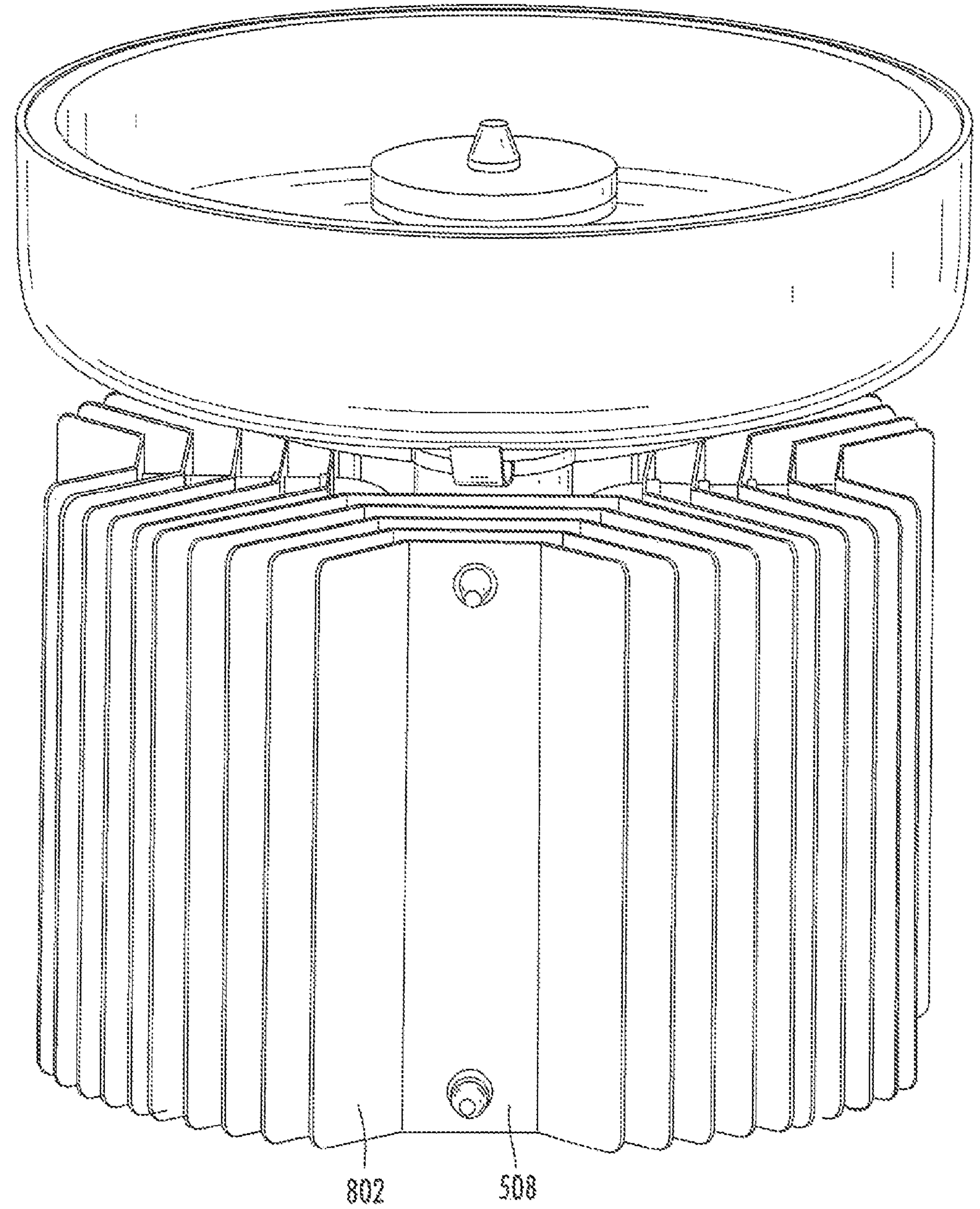
FIG. 8 is a perspective view of a third exemplary embodiment of the present invention.
Figure 9:
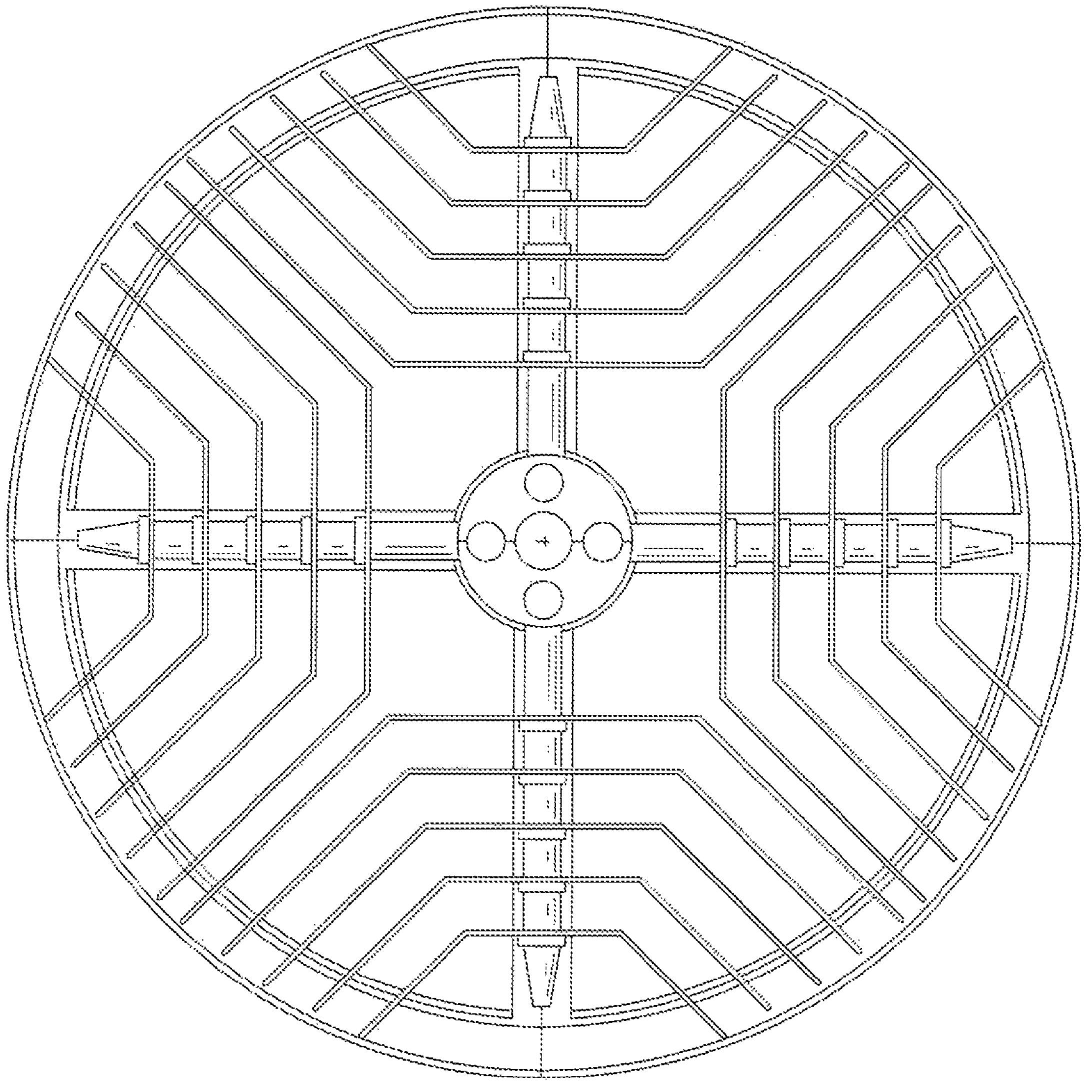
FIG. 9 is a top cross section of the embodiment shown in FIG. 8.

Another configuration for planar fins 512 is shown in FIGS. 8 and 9. Rather than each heat dissipating planar fins 508 being in a single plane, portion 802 of each fin is angled radially outward by approximately 120 degrees from the plane of each fin. This configuration permits a larger surface area for heat dissipation for each fin, as well as better airflow dynamics permitting more efficient venting and dissipation of heat to the outside of lighting apparatus 100.

As apparent, the size and shape of axial heat pipe 110 and heat sink 120 may be varied depending on the heat dissipation requirements of the LEDs used within illuminating apparatus 100. The above described heat dissipating mechanisms permit lighting apparatuses to use LEDs generating 60 W or more of power and emitting over 4000 lumens.

Although other modifications and changes may be suggested by those skilled in the art, it is the intention of the inventors to embody within the patent warranted hereon all changes and modifications that reasonably and properly come within the scope of their contribution to the art.

What is claimed is:

1. A lighting apparatus comprising:

a concave reflector having a front side with a reflective surface, a rear side, a focal point and a principal axis;

an axial heat pipe extending longitudinally near the principal axis of the reflector, the heat pipe having a proximal end extending from the front side of the reflector and a distal end extending from the rear side of the reflector;

at least one LED thermally coupled to the axial heat pipe at or adjacent to the focal point of the reflector; and a means for dissipation of heat coupled to the distal end of the axial heat pipe, the means for dissipation of heat including:

a radial heat pipe thermally coupled to the axial heat pipe and extending radially outward from the axial heat pipe;

a first heat dissipating planar fin thermally coupled to the radial heat pipe and radially extending from the radial heat pipe along a radial direction of the radial heat pipe, the first heat dissipating planar fin including:

a planar surface substantially parallel to an axial direction of the axial heat pipe and the radial direction of the radial heat pipe, and first and second angled extensions extending from opposite ends of the planar surface, the first and second angled extensions forming respective angles with the planar surface; and a second heat dissipating planar fin thermally coupled to the radial heat pipe and spaced apart from the first heat dissipating planar fin along the radial heat pipe, the second heat dissipating planar fin radially extending from the radial heat pipe along the radial direction of the radial heat pipe, wherein:

the second heat dissipating planar fin is spaced farther from the axial heat pipe than the first heat dissipating planar fin, and the second heat dissipating planar fin has a planar surface substantially parallel to the planar surface of the first heat dissipating planar fin, the planar surface of the first heat dissipating planar fin being larger than the planar surface of the second heat dissipating planar fin.

2. The lighting apparatus of claim 1, further comprising:

a casing coupled to a rim along the periphery of the concave reflector.

3. The lighting apparatus of claim 2, wherein the casing is thermally isolated from the heat sink and has ventilation holes for dissipation of heat energy.

4. The lighting apparatus of claim 1, wherein the radial heat pipe is U-shaped, L-shaped, or C-shaped.

5. The lighting apparatus of claim 1, further comprising:

a heat spreader thermally coupled between the at least one LED and the axial heat pipe.

6. The lighting apparatus of claim 1, wherein the second heat dissipating planar fin further comprises:

third and fourth angled extensions extending from opposite ends of the planar surface of the second heat dissipating planar fin, the third and fourth angled extensions forming respective angles with the planar surface of the second heat dissipating planar fin.

7. The lighting apparatus of claim 6, wherein the third and the fourth angled extensions are substantially parallel to the first and the second angled extensions, respectively.

8. The lighting apparatus of claim 1, wherein the first and the second angled extensions form an approximate 120 degree angle with respect to the planar surface of the first heat dissipating planar fin.

9. The lighting apparatus of claim 6, wherein the third and the fourth angled extensions form an approximate 120 degree angle with respect to the planar surface of the second heat dissipating planar fin.

10. A lighting apparatus comprising:

a concave reflector having a front side with a reflective surface, a rear side, a focal point and a principal axis;

an axial heat pipe extending longitudinally near the principal axis of the reflector, the heat pipe having a proximal end extending from the front side of the reflector and a distal end extending from the rear side of the reflector;

at least one LED thermally coupled to the axial heat pipe at or adjacent to the focal point of the reflector; and a heat sink coupled to the distal end of the axial heat pipe, the heat sink including:

a radial heat pipe thermally coupled to the axial heat pipe and extending radially outward from the axial heat pipe;

a first heat dissipating planar fin thermally coupled to the radial heat pipe and radially extending from the radial heat pipe along a radial direction of the radial heat pipe, the first heat dissipating planar fin including:

a planar surface substantially parallel to an axial direction of the axial heat pipe and the radial direction of the radial heat pipe, and first and second angled extensions extending from opposite ends of the planar surface, the first and second angled extensions forming respective angles with the planar surface; and a second heat dissipating planar fin thermally coupled to the radial heat pipe and spaced apart from the first heat dissipating planar fin along the radial heat pipe, the second heat dissipating planar fin radially extending from the radial heat pipe along the radial direction of the radial heat pipe, wherein:

the second heat dissipating planar fin is spaced farther from the axial heat pipe than the first heat dissipating planar fin, and the second heat dissipating planar fin has a planar surface substantially parallel to the planar surface of the first heat dissipating planar fin, the planar surface of the first heat dissipating planar fin being larger than the planar surface of the second heat dissipating planar fin.

11. The lighting apparatus of claim 10, wherein the second heat dissipating planar fin further comprises:

third and fourth angled extensions extending from opposite ends of the planar surface of the second heat dissipating planar fin, the third and fourth angled extensions forming respective angles with the planar surface of the second heat dissipating planar fin.

12. The lighting apparatus of claim 11, wherein the third and the fourth angled extensions are substantially parallel to the first and the second angled extensions, respectively.

* * * * *